(12) United States Patent
Ikemoto et al.

(10) Patent No.: US 8,111,598 B2
(45) Date of Patent: Feb. 7, 2012

(54) OPTICAL DISK APPARATUS AND EMISSION CONTROL METHOD

(75) Inventors: Yuichiro Ikemoto, Kanagawa (JP); Shintaro Tanaka, Tokyo (JP); Koji Ashizaki, Tokyo (JP)

(73) Assignee: Sony Corporation, Tokyo (JP)

( * ) Notice: Subject to any disclaimer, the term of this patent is extended or adjusted under 35 U.S.C. 154(b) by 281 days.

(21) Appl. No.: 12/489,581

(22) Filed: Jun. 23, 2009

(65) Prior Publication Data

US 2010/0008197 A1    Jan. 14, 2010

(30) Foreign Application Priority Data

Jul. 11, 2008   (JP) .................................. 2008-181715

(51) Int. Cl.
*G11B 7/00* (2006.01)

(52) U.S. Cl. ................. 369/47.27; 369/47.31; 369/47.4; 369/47.41; 250/201.5

(58) Field of Classification Search ............... 369/47.27, 369/47.28, 47.31, 47.4, 47.41
See application file for complete search history.

(56) References Cited

FOREIGN PATENT DOCUMENTS

JP    2002-150762    5/2002

OTHER PUBLICATIONS

U.S. Appl. No. 12/424,834, filed Apr. 16, 2009, Ikemoto, et al.

*Primary Examiner* — Adam R Giesy
(74) *Attorney, Agent, or Firm* — Oblon, Spivak, McClelland, Maier & Neustadt, L.L.P.

(57) ABSTRACT

An optical disk apparatus according to the present invention includes a spindle motor that rotates an optical disk on whose information recording surface a plurality of addresses is recorded, an optical pickup that records/reproduces an information signal on/from the information recording surface of the optical disk rotated by the spindle motor, an strobe light-emitting unit that irradiates a label surface of the optical disk with light, and a control unit that causes the strobe light-emitting unit to emit light based on an address selected from the plurality of addresses as a reference address and a reference signal readable from the optical disk.

6 Claims, 15 Drawing Sheets

OPTICAL DISK APPARATUS AND EMISSION CONTROL METHOD

BACKGROUND OF THE INVENTION

1. Field of the Invention

The present invention relates to an optical disk apparatus and an emission control method, and in particular, relates to an optical disk apparatus enabling visual recognition of a label surface of a rotating recording medium and an emission control method thereof.

2. Description of the Related Art

In recent years, it has become common to use an optical disk as a recording medium in which video and sound are recorded in digital format. Visible information can be written on the label surface, which is a non-recording surface of an optical disk. For example, management of optical disks can be made easier by writing information about content recorded in optical disks.

Visible information printed on a label surface can visually be recognized while a recording medium is stopped, but it is difficult to visually recognize visible information when the recording medium is rotating at high speed. However, in order to check content of an optical disk being reproduced or to check whether or not visible information is printed correctly when the visible information is printed on a label surface, visual recognizability of visible information on a label surface has been demanded even when a recording medium is rotating at high speed.

In response to such a demand, Japanese Patent Application Laid-Open No. 2002-150762, for example, discloses a technology to flash a strobe light to a label surface so that visible information on the label surface can visually be recognized even when a recording medium is rotating. Such a disk apparatus detects a rotational period of a disk from an address of the disk and exercises emission control of an emission means based on the detected rotational period.

SUMMARY OF THE INVENTION

However, visible information written on a label surface of a disk does not correspond to information on an information recording surface. Thus, it is difficult for a disk apparatus in Japanese Patent Application Laid-Open No. 2002-150762 to view visible information at any position unless a user inputs information about at which position of the disk visible information on the label surface is written.

The present invention has been made in view of the above issue and it is desirable to provide a novel and improved optical disk apparatus enabling to view visible information written on a label surface at any position and an emission control method.

According to an embodiment of the present invention, there is provided an optical disk apparatus including: a rotation driving unit that rotates a recording medium on whose information recording surface a plurality of addresses is recorded; an optical pickup that records an information signal onto and plays back the information signal from the information recording surface of the recording medium that is rotated by the rotation driving unit; a light-emitting unit that irradiates a label surface of the recording medium with light; and a control unit that causes the light-emitting unit to emit light based on an address selected from the plurality of addresses as a reference address and a reference signal readable from the recording medium.

According to the present invention, a position state to be a reference of a recording medium and an angle of rotation of the recording medium are detected based on a reference address of the recording medium and a reference signal readable from a board surface of the recording medium to cause a light-emitting unit to emit light. Thus, the angle of rotation of the recording medium can be grasped correctly by controlling light emission of the light-emitting unit based on information held by the recording medium, making the recording medium viewable at a desired position.

The control unit may include: a detection unit that detects the reference signal by the optical pickup; a deciding unit that decides a reference position state of the recording medium based on the reference address; a timing calculation unit that calculates emission timing when the light-emitting unit is caused to emit light based on the reference signal and the reference address; and an emission control unit that causes the light-emitting unit to emit light based on the emission timing.

Furthermore, the timing calculation unit may calculate a showing clock count obtained by converting an angle of rotation of the recording medium from the reference position state to a light-emitting position where the light-emitting unit is caused to emit light into the clock count of the reference signal. At this time, the emission control unit starts to count the clock count of the reference signal from the reference position state and causes the light-emitting unit to emit light when the clock count reaches the showing clock count.

Moreover, the emission control unit may count the clock count of the reference signal from the reference position state each time the recording medium makes as many turns as a predetermined number and cause the light-emitting unit to emit light when the clock count reaches the showing clock count. Alternatively, the timing calculation unit may change the showing clock count by a predetermined clock count each time the recording medium makes as many turns as a predetermined number. Here, the predetermined number can be 1 or a number equal to or greater than 2.

The optical disk apparatus according to the present embodiment may further include an input unit that inputs a showing position of the label surface of the recording medium. At this time, the timing calculation unit converts the angle of rotation of the recording medium from the reference position state until the showing position is brought into show into the showing clock count and the emission control unit may count the clock count of the reference signal from the reference position state and cause the light-emitting unit to emit light when the clock count reaches the showing clock count.

The reference address may be an address serving as a reference of rotation control of the recording medium when the label surface of the recording medium is printed.

According to another embodiment of the present invention, there is provided an emission control method including the steps of: rotating a recording medium on whose information recording surface a plurality of addresses is recorded; recording an information signal onto and playing back the information signal from the information recording surface of the rotated recording medium; irradiating a label surface of the recording medium with light; and causing a light-emitting unit to emit light based on an address selected from the plurality of addresses as a reference address and a reference signal readable from the recording medium.

According to the embodiments of the present invention, an optical disk apparatus enabling to view visible information written on a label surface at any position and an emission control method can be provided.

DETAILED DESCRIPTION OF THE PREFERRED EMBODIMENTS

Figure 1:
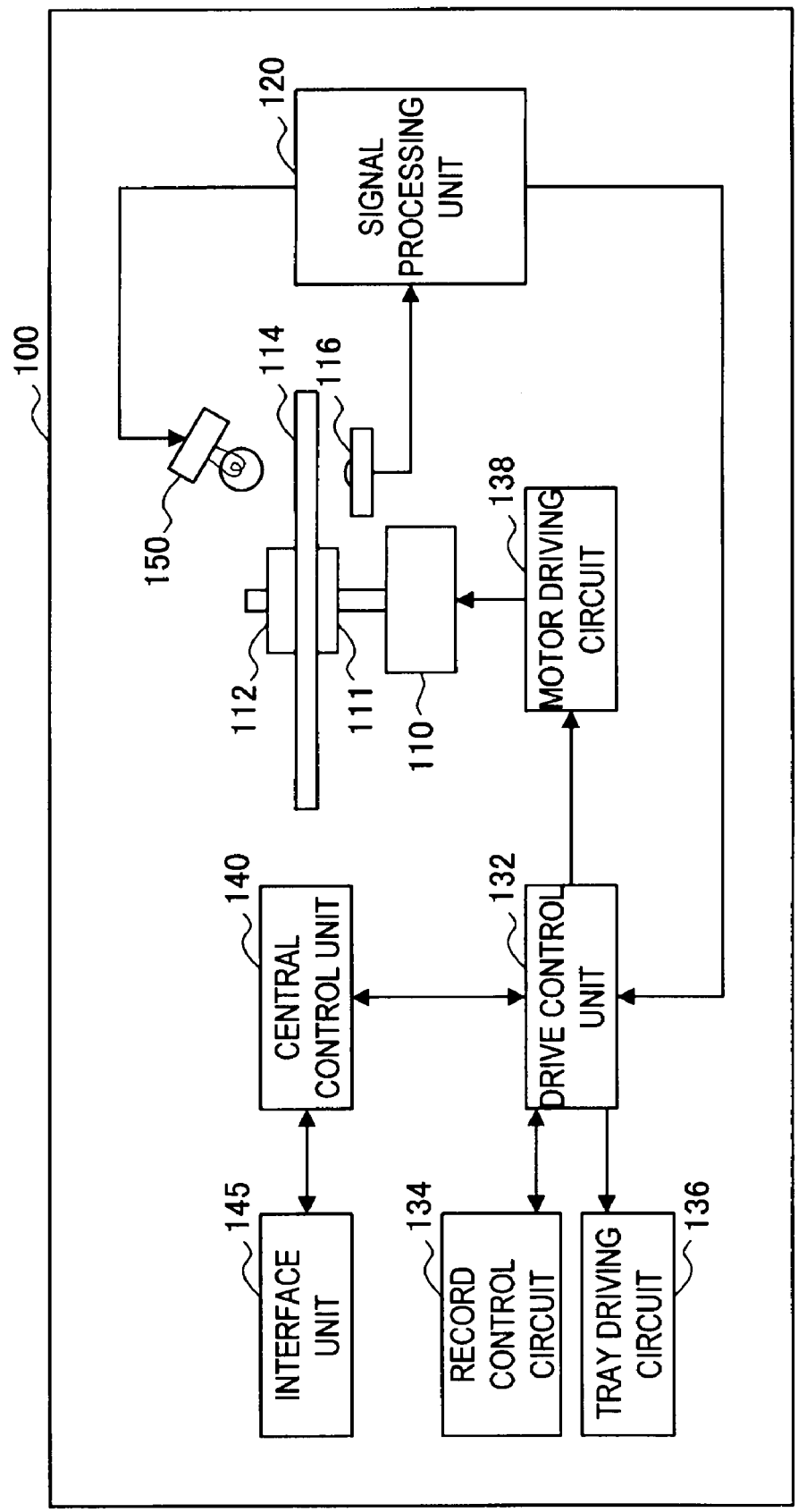
FIG. 1 is a block diagram showing a configuration of an optical disk apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Figure 2:
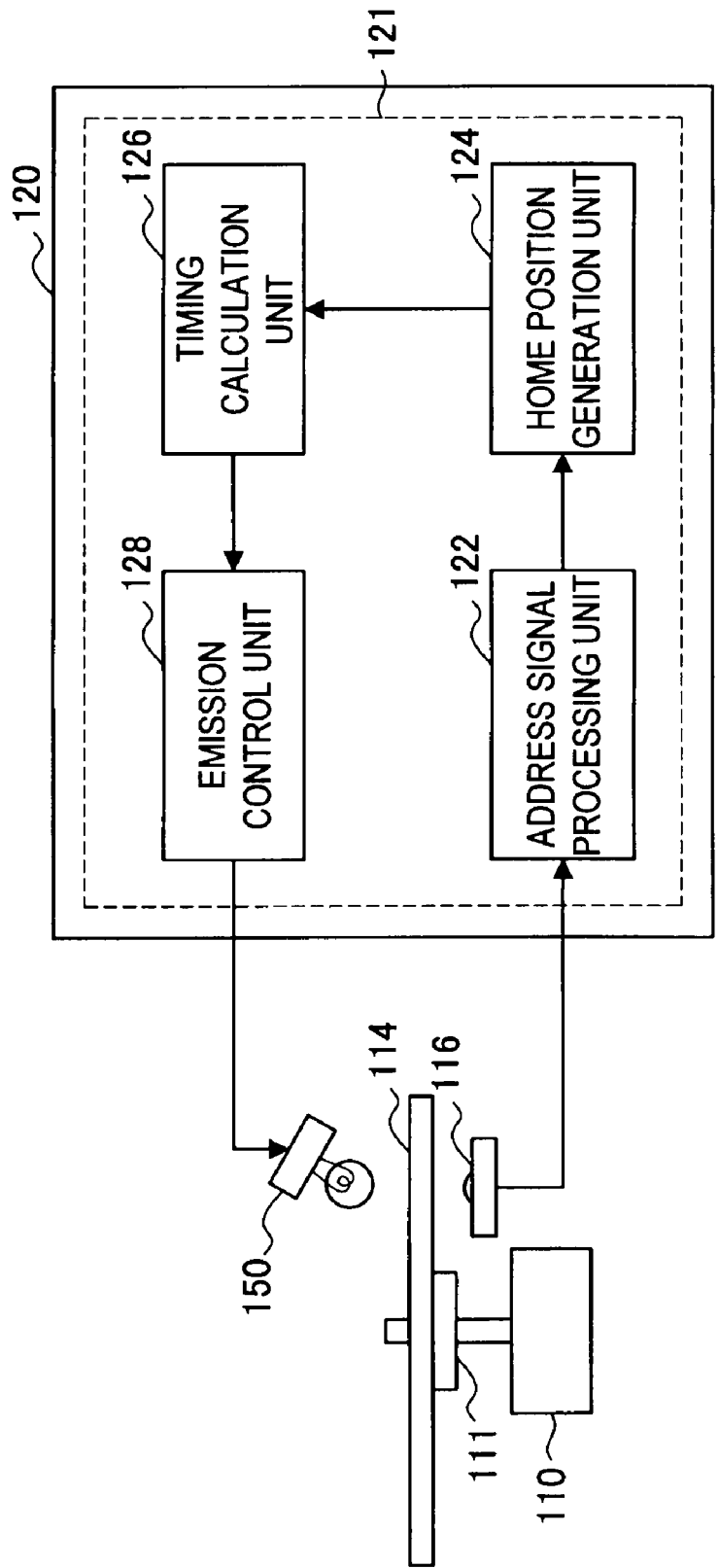
FIG. 2 is a block diagram showing the configuration of a control unit of the optical disk apparatus according to the first embodiment.

First, an optical disk apparatus 100 according to the first embodiment of the present invention will be described based on FIG. 1 and FIG. 2. FIG. 1 is a block diagram showing the configuration of the optical disk apparatus 100 according to the present embodiment. FIG. 2 is a block diagram showing the configuration of a control unit 121 of the optical disk apparatus 100 according to the present embodiment.

<Configuration of the Optical Disk Apparatus>

The optical disk apparatus 100 according to the present embodiment can record a new information signal on the information recording surface of an optical disk 114 and reproduce a pre-recorded information signal. The optical disk 114 is, for example, a CD-R (Compact Disc-Recordable), DVD-RW (Digital Versatile Disc-Rewritable) or the like.

As shown in FIG. 1, the optical disk apparatus 100 includes a spindle motor 110 that rotates the optical disk 114, an optical pickup 116, a signal processing unit 120, a drive control unit 132, a record control circuit 134, a tray driving circuit 136, a motor driving circuit 138, a central control unit 140, an interface unit 145, and a strobe light-emitting unit 150.

The spindle motor 110 is a rotation driving unit to rotate the optical disk 114. A table 111 on which the optical disk 114 is placed is provided on a rotation axis of the spindle motor 110. The optical disk 114 can be rotated integrally with the table 111 by fitting a center hole of the optical disk 114 to the table 111. The spindle motor 110 also includes a chucking plate 112 to fix the optical disk 114 from above the optical disk 114 fitted to the table 111. The chucking plate 112 is rotatably supported by a supporting plate (not shown) and thus can rotate integrally with the optical disk 114. Thus, the optical disk 114 is prevented from being separated from the table 111 by the optical disk 114 being sandwiched between the chucking plate 112 and the table 111.

The optical pickup 116 includes a light-emitting unit that emits light and a light-receiving unit that receives returned light of the light emitted from the light-emitting unit. The optical pickup 116 records an information signal by emitting light to an information recording surface of the optical disk 114 rotated by the spindle motor 110. The optical pickup 116 also reproduces an information signal recorded on the information recording surface by detecting returned light of the light emitted from the light-emitting unit. The optical pickup 116 is mounted on a pickup base (not shown) and moved together with the pickup base.

The signal processing unit 120 is a processing unit that generates a reproduced data signal from a signal (for example, an RF (Radio Frequency) signal) input from the optical pickup 116. The signal processing unit 120 also detects a signal having a specific pattern such as a synchronizing signal based on an RF signal or a position data signal indicating position information of an optical disk. The signal processing unit 120 outputs the detected reproduced data signal or position data signal to the drive control unit 132 described later.

The signal processing unit 120 includes the control unit 121 that controls light emission of the strobe light-emitting unit 150. As shown in FIG. 2, the control unit 121 includes an address signal processing unit 122, a home position generation unit 124, a timing calculation unit 126, and an emission control unit 128.

The address signal processing unit 122 acquires the clock count while the optical disk 114 makes a turn for one address among a plurality of addresses on the optical disk 114. The address signal processing unit 122 acquires the clock count while the optical disk 114 makes a turn from a clock counter (not shown) that measures the clock count of a reference signal readable from the optical disk 114. The reference signal is a signal used for rotation control and is a signal generated based on a clock read from the board surface of the optical disk 114 based on a position data signal from the optical pickup 116. A wobble clock, for example, can be used as such a clock. The address signal processing unit 122 outputs the acquired clock count to the home position generation unit 124.

The home position generation unit 124 decides a home position to be a reference position state of rotation of the optical disk 114 and the showing of the label surface. The home position generation unit 124 decides a reference address decided from the plurality of addresses on the optical disk 114. Then, the home position generation unit 124 selects the position state of the optical disk 114 when the address read by the optical pickup 116 and the reference address match as the home position.

The timing calculation unit 126 calculates emission timing for causing the strobe light-emitting unit 150 to emit light. When a position state to be shown of the label surface of the optical disk 114 is input from the interface unit 145 described later, the timing calculation unit 126 calculates the showing clock count, which is the clock count to indicate the angle of rotation from the home position to the relevant position state. The timing calculation unit 126 outputs the calculated showing clock count to the emission control unit 128.

The emission control unit 128 causes the strobe light-emitting unit 150 to emit light based on the showing clock count calculated by the timing calculation unit 126.

Returning to FIG. 1, the drive control unit 132 outputs a control signal to the motor driving circuit 138 to control driving of a pickup driving motor (not shown) that drives the spindle motor 110 and the pickup base. The drive control unit 132 also outputs a control signal to the optical pickup 116 to control a track servo and a focus servo so that light emitted from the optical pickup 116 follows tracks of the optical disk 114. Further, the drive control unit 132 outputs a reproduced data signal to the record control circuit 134 described later and an opening/closing control signal to control opening/closing of a tray to the tray driving circuit 136. The drive control unit 132 also outputs at least a position data signal among data signals input from the signal processing unit 120 to the central control unit 140 described later.

The record control circuit 134 performs processing such as encode processing and modulation on a reproduced data signal input from the drive control unit 132 and outputs the processed reproduced data signal to the drive control unit 132. The tray driving circuit 136 generates a control signal to control a driving unit (not shown) that drives opening/closing of the tray based on an opening/closing control signal input from the drive control unit 132. Then, the motor driving circuit 138 drives the spindle motor 110 to rotate based on a control signal input from the drive control unit 132.

The central control unit 140 controls the drive control unit 132. The central control unit 140 outputs a recording data signal input from the interface unit 145 to the drive control unit 132. The central control unit 140 also outputs a reproduced data signal and the like read from the information recording surface of the optical disk 114 to an external device via the interface unit 145.

The interface unit 145 is a connection unit that connects an external device such as a personal computer and the optical disk apparatus 100. The interface unit 145 outputs a signal input from an external device to the central control unit 140 or outputs a signal input from the central control unit 140 to an external device. Signals input from an external device include, for example, a recording data signal corresponding to recording information to be recorded on the information recording surface of the optical disk 114. On the other hand, signals input from the central control unit 140 include, for example, a reproduced data signal read from the information recording surface of the optical disk 114.

The strobe light-emitting unit 150 is a light-emitting unit that irradiates the label surface of the optical disk 114 with light and, for example, a flash device that emits light instantaneously can be used. The strobe light-emitting unit 150 emits light by being controlled to emit light by the emission control unit 128. Here, if the rotation of the optical disk 114 is fast and the emission time of the strobe light-emitting unit 150 is long, the optical disk 114 rotates during light emission, blurring visible information to be viewed. If, for example, the optical disk 114 rotates during light emission, an afterimage while visible information (for example, characters) written on the label surface moves becomes visible. Visible information can be viewed without being blurred by making the emission time as short as possible, but there is a possibility that the whole label surface is not visually recognizable due to insufficient quantity of light. Thus, the emission time is adjusted in accordance with brightness of light emitted by the strobe light-emitting unit 150. Quality of visible information on the label surface viewed during rotation is decided by the emission time of the strobe light-emitting unit 150.

In the foregoing, the configuration of the optical disk apparatus 100 according to the present embodiment has been described. The optical disk apparatus 100 according to the present embodiment causes the strobe light-emitting unit 150 to emit light at the predetermined timing so that visible information written on the label surface of the rotating optical disk 114 can visually be recognized.

Figure 3:
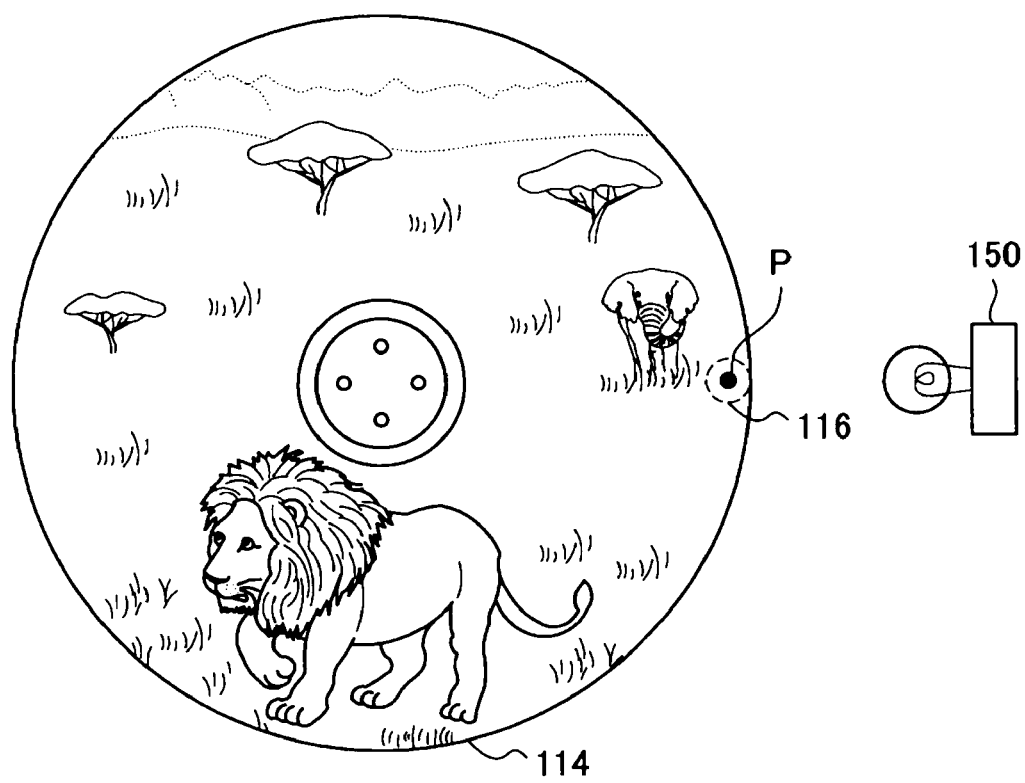
FIG. 3 is an explanatory view showing a relationship between a light-emitting position of an optical disk and emission timing of a strobe light-emitting unit.

Here, the relationship between a light-emitting position of the optical disk 114 and emission timing of the strobe light-emitting unit 150 will be described based on FIG. 3 and FIG. 4. As mentioned above, the emission control unit 128 causes the strobe light-emitting unit 150 to emit light when the clock count of the reference signal counted from the reference address reaches the showing clock count after the reference address being read by the optical pickup 116. If, for example, the strobe light-emitting unit 150 is caused to emit light when a reference address P is read by the optical pickup 116, the strobe light-emitting unit 150 is caused to emit light when the optical disk 114 is in a position state as shown in FIG. 3. At this point, a user can view the label surface in a state shown in FIG. 3.

Figure 4:
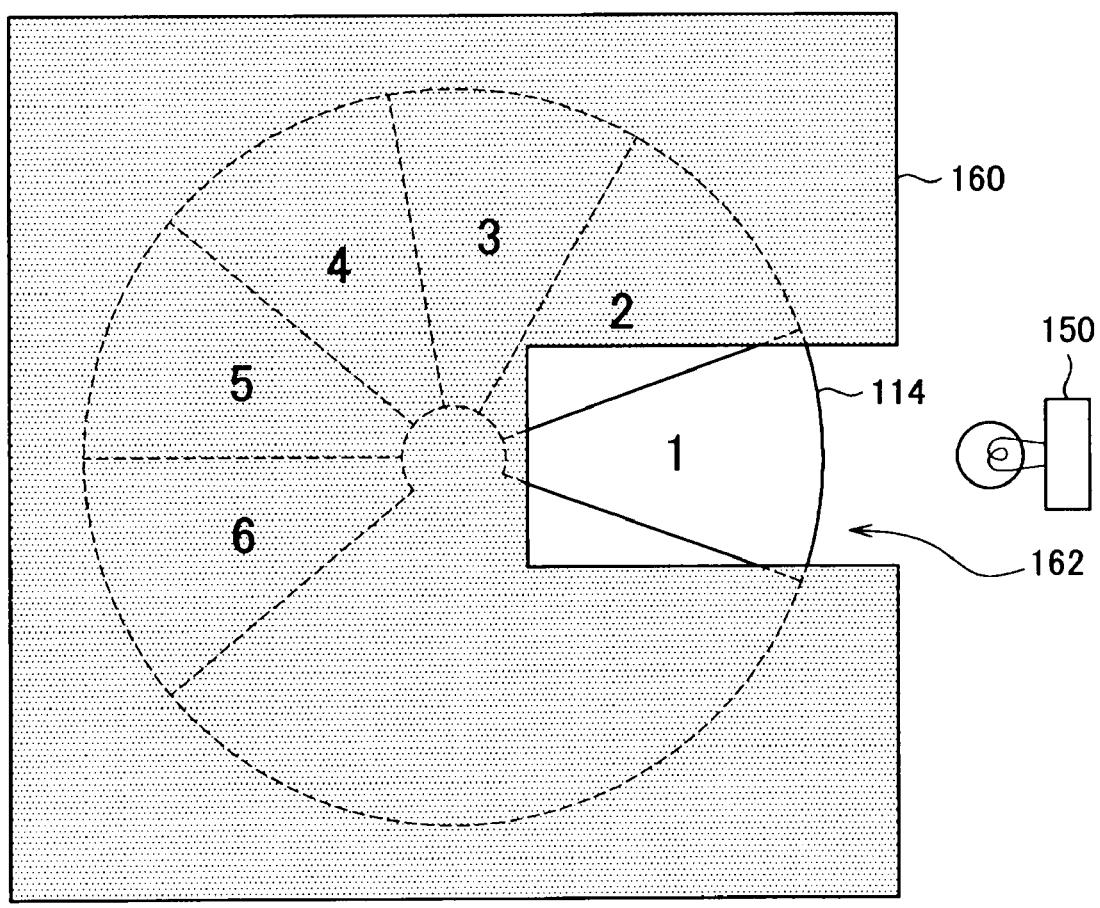
FIG. 4 is an explanatory view illustrating a state of being able to view only a portion of a label surface of the optical disk from an opening of the optical disk apparatus.

However, if, as shown in FIG. 4, only a portion of the label surface of the optical disk 114 can be viewed from an opening 162 formed in a cabinet 160 due to the configuration of the optical disk apparatus 100, only a specific portion of the label surface can be viewed. That is, when the strobe light-emitting unit 150 emits light in the home position, a first area of the label surface corresponding to the opening 162 in the home position can be viewed, but it is difficult to view other areas.

Figure 5:
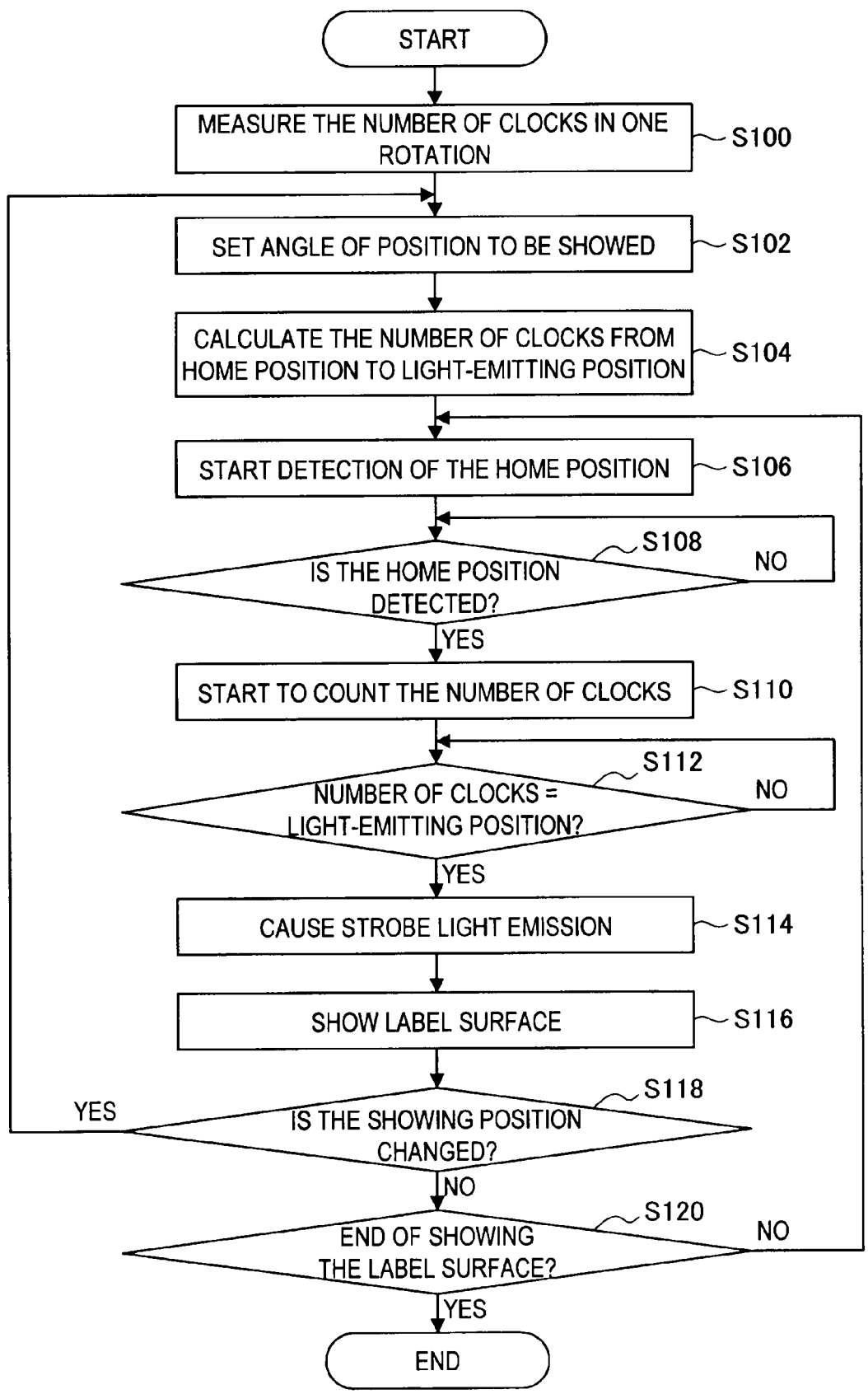
FIG. 5 is a flow chart illustrating an emission control method according to the first embodiment.
Figure 6:
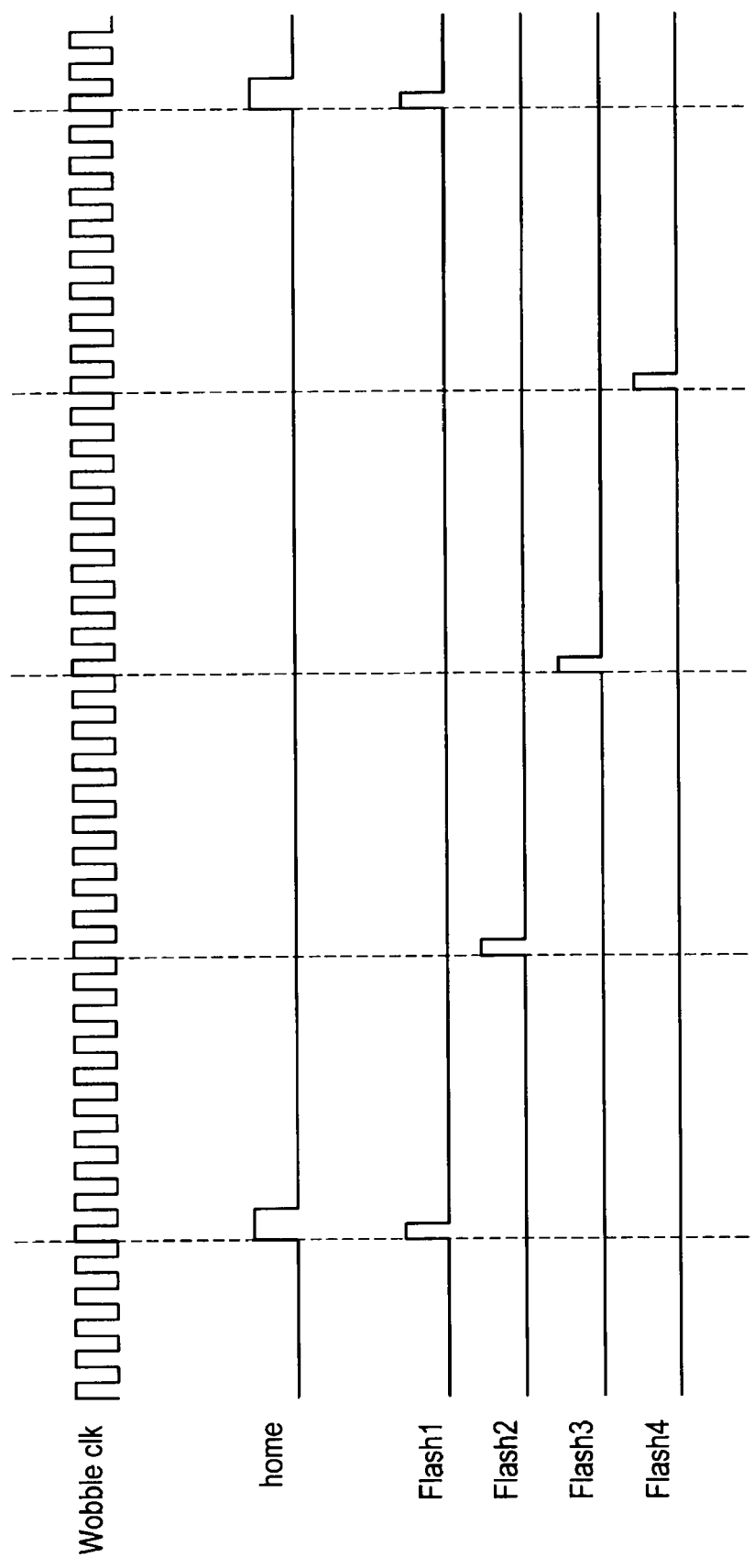
FIG. 6 is an explanatory view illustrating the emission timing of the strobe light-emitting unit according to the first embodiment.
Figure 7:
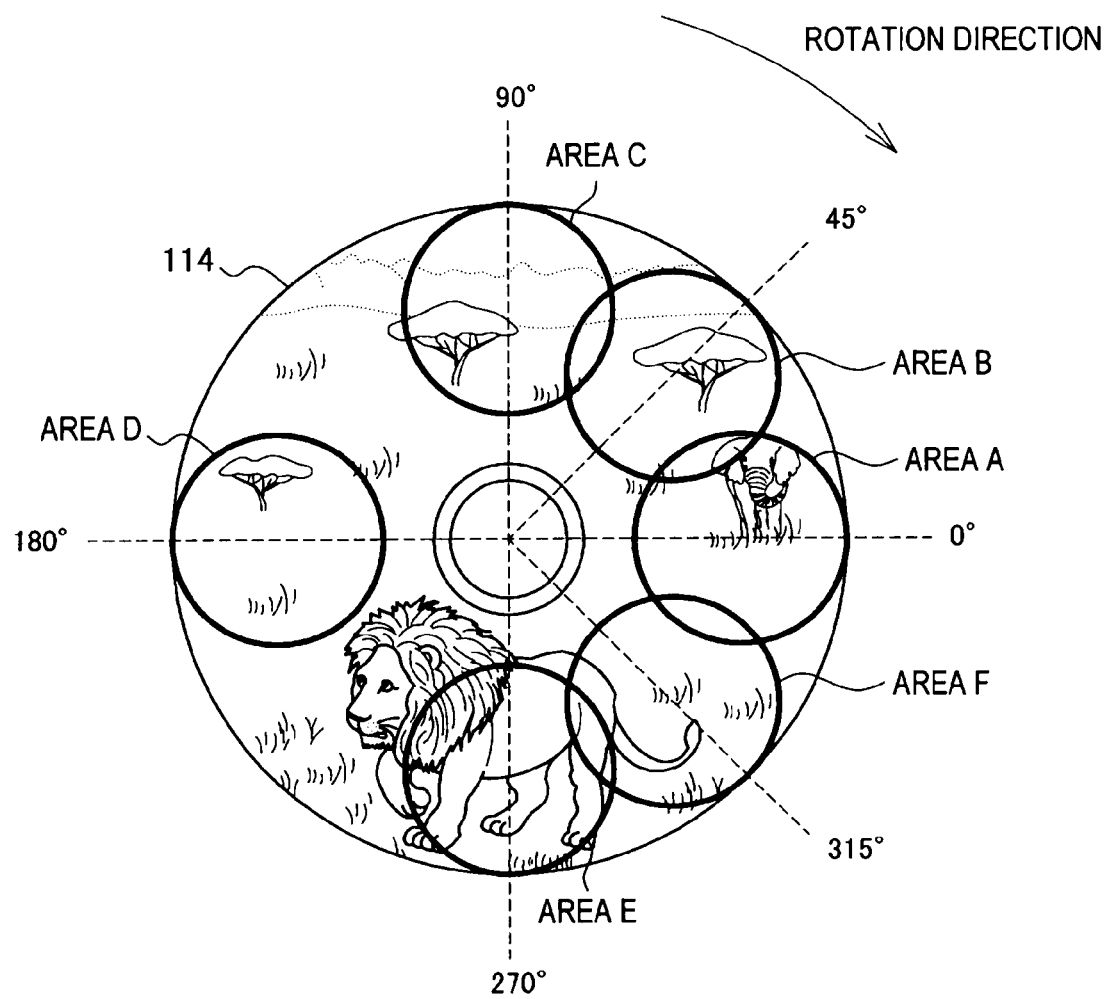
FIG. 7 is an explanatory view illustrating showing positions on the label surface of the optical disk.
Figure 8:
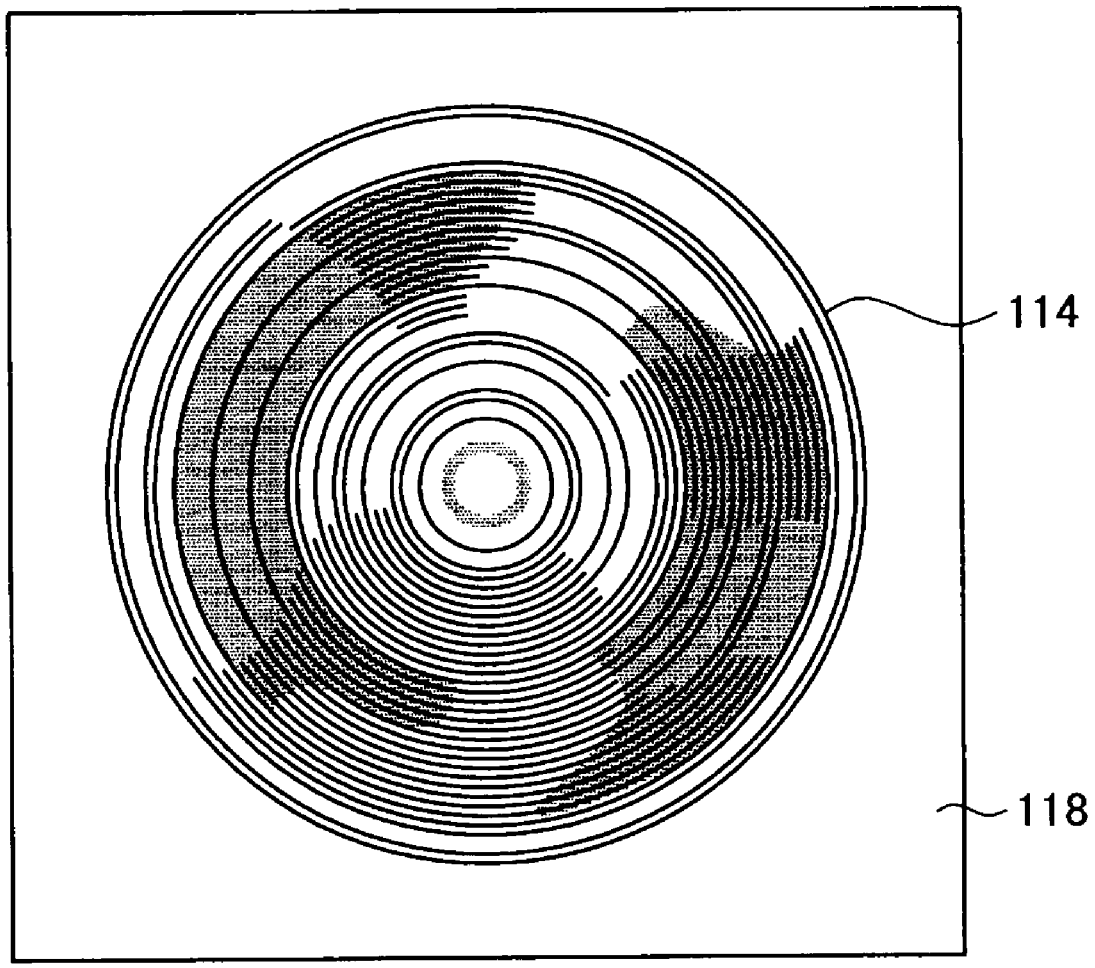
FIG. 8 is an explanatory view showing how the label surface of the optical disk looks like when the strobe light-emitting unit is not caused to emit light.

Thus, according to an emission control method of a strobe light-emitting unit according to the present embodiment, emission timing for the strobe light-emitting unit 150 is controlled so that visible information on the label surface can be viewed at a desired position such as associating a desired area with the position of the opening 162. The emission control method of the strobe light-emitting unit 150 according to the present embodiment will be described based on FIG. 5 to FIG. 9D. FIG. 5 is a flow chart illustrating an emission control method according to the present embodiment. FIG. 6 is an explanatory view illustrating the emission timing of the strobe light-emitting unit 150 according to the present embodiment. FIG. 7 is an explanatory view illustrating showing positions on the label surface of the optical disk 114. FIG. 8 is an explanatory view showing how the label surface of the optical disk 114 looks like when the strobe light-emitting unit 150 is not caused to emit light. FIG. 9A to FIG. 9D are explanatory views showing changes of how the label surface of the optical disk 114 looks like depending on emission timing of the strobe light-emitting unit 150.

<Emission Control Method>

In the emission control method of the strobe light-emitting unit 150 according to the present embodiment, as shown in FIG. 4, first the clock count in one turn of the optical disk 114 is measured (step S100). The optical disk apparatus 100 according to the present embodiment uses a clock readable from the board surface of the optical disk 114 as the reference signal. A wobble clock, for example, can be used as such a clock. As shown in FIG. 6, a wobble clock is periodically generated. The address signal processing unit 122 acquires the clock count of the reference signal while the optical disk 114 makes a turn for one address among a plurality of addresses on the optical disk 114 from a clock counter (not shown). If, for example, the clock count of a wobble clock while the optical disk 114 makes a turn is acquired for the reference address, the clock count while the optical disk 114 makes a turn is the clock count of the wobble clock present in one section of the home signal shown in FIG. 6.

Next, the angle of rotation from the home position for a showing portion of the label surface is set (step S102). If, as shown, for example, in FIG. 4, only a portion of the label surface is viewable from the opening 162 of the optical disk apparatus 100, which position to make viewable is set. The position on the label surface to be shown can be indicated by, as shown, for example, in FIG. 7, how much the position is rotated in the rotation direction from the home position (position state of the optical disk 114 shown in FIG. 7). To bring, for example, an area A into show, there is no shift from the home position and thus, 0° is set. Similarly, 45° is set for an area B, 90° for an area C, 180° for an area D, 270° for an area E, and 315° for an area F.

Further, the timing calculation unit 126 calculates the clock count from the home position to the light-emitting position (step S104). The light-emitting position is a position where the strobe light-emitting unit 150 is caused to emit light to show the label surface of the optical disk 114 in a desired position state. At step S104, the clock count before a position state in which the optical disk 114 rotates by a set angle from the home position is reached is calculated based on the clock count when the optical disk 114 makes a turn calculated at step S100 and the angle set at step S102. The clock count described above is also called the showing clock count.

Subsequently, detection of the home position is started (step S106). The home position generation unit 124 reads the reference address P on the optical disk 114 and sets the position where the reference address P and the address read by the optical pickup 116 match as the home position. A signal activated when the reference address P and the address read by the optical pickup 116 match is set as a home signal (see FIG. 6). The above processing is performed until the home position is detected (step S108).

Next, after the home position is detected, the clock count of the wobble clock from the home position is counted (step S110). Then, it is determined whether the counted clock count and the showing clock count calculated at step S104 match (step S112) and determination processing is repeated by performing count processing until these clock counts match.

If it is determined at step S112 that the counted clock count and the clock count between the home position and the light-emitting position are equal, the emission control unit 128 causes the strobe light-emitting unit 150 to emit light (step S114). Accordingly, the label surface of the rotating optical disk 114 is irradiated with the light so that visible information on the label surface can be viewed (step S116).

Subsequently, it is determined whether any instruction to change the showing position of the label surface has been issued (step S118) and if an instruction to change the view position has been issued, processing returns to step S102. Then, the clock count between the home position and the light-emitting position for the new showing position is calculated and the home position is detected and then, the strobe light-emitting unit 150 is caused to emit light when the clock count counted from the home position becomes equal to the showing clock count.

If, on the other hand, it is determined at step S118 that no instruction to change the showing position has been issued, it is determined whether any instruction to terminate showing processing of the label surface has been issued (step S120). If no instruction to terminate showing processing has been issued, processing returns to step S106 and the strobe light-emitting unit 150 is caused to emit light to continue showing of the label surface. If an instruction to terminate showing processing has been issued, showing processing of the label surface is terminated.

In the foregoing, the emission control method of the strobe light-emitting unit 150 according to the present embodiment has been described. Here, how to make the area A, area C, area D, and area E in FIG. 7 viewable from the opening 162 of the optical disk apparatus 100 by causing the strobe light-emitting unit 150 to emit light by the emission control method according to the present embodiment will be described.

To bring the area A into show, it is only necessary to cause the strobe light-emitting unit 150 to emit light in timing when the home signal is activated because there is no shift from the home position. This emission timing is like the flash 1 in FIG. 6. To bring the area B into show, emission timing is set so that light is emitted when the optical disk 114 is rotated by 90° from the home position because the area B is shifted by 90° from the home position. The clock count when the optical disk 114 makes a one-fourth turn corresponds to that of the wobble clock present in the ¼ section of the home signal in FIG. 6. Thus, the emission timing to bring the area B into show is set in such a way that, like the flash 2 in FIG. 6, the strobe light-emitting unit 150 is activated at a position delayed by the clock count from the position where the home signal is activated.

Similarly, to bring the area C into show, emission timing is set so that light is emitted when the optical disk 114 is rotated by 180° (half turn) from the home position. That is, the emission timing to bring the area C into show is set in such a way that, like the flash 3 in FIG. 6, the strobe light-emitting unit 150 is activated at a position delayed by the clock count present in the ½ section of the home signal from the position where the home signal is activated. Then, to bring the area D into show, emission timing is set so that light is emitted when the optical disk 114 is rotated by 270° (three-quarter turn) from the home position. That is, the emission timing to bring the area D into show is set in such a way that, like the flash 4 in FIG. 6, the strobe light-emitting unit 150 is activated at a position delayed by the clock count present in the ¾ section of the home signal from the position where the home signal is activated.

If the label surface of the rotating optical disk 114 is viewed without causing the strobe light-emitting unit 150 to emit light, as shown in FIG. 8, visible information on the label surface rolls, making recognition of the visible information difficult. If, on the other hand, the strobe light-emitting unit 150 is caused to emit light in predetermined emission timing, as shown in FIG. 9A to FIG. 9D, visible information on the label surface at a position corresponding to the emission timing can be recognized.

Figure 9A:
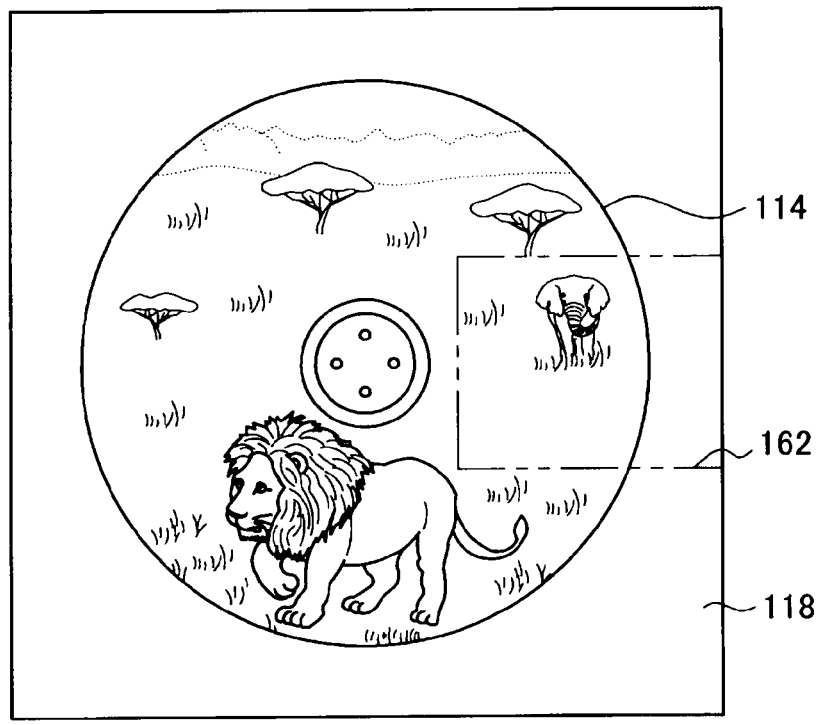
FIG. 9A is an explanatory view showing how the label surface of the optical disk looks like when the strobe light-emitting unit is caused to emit light in the emission timing of a flash 1.
Figure 9B:
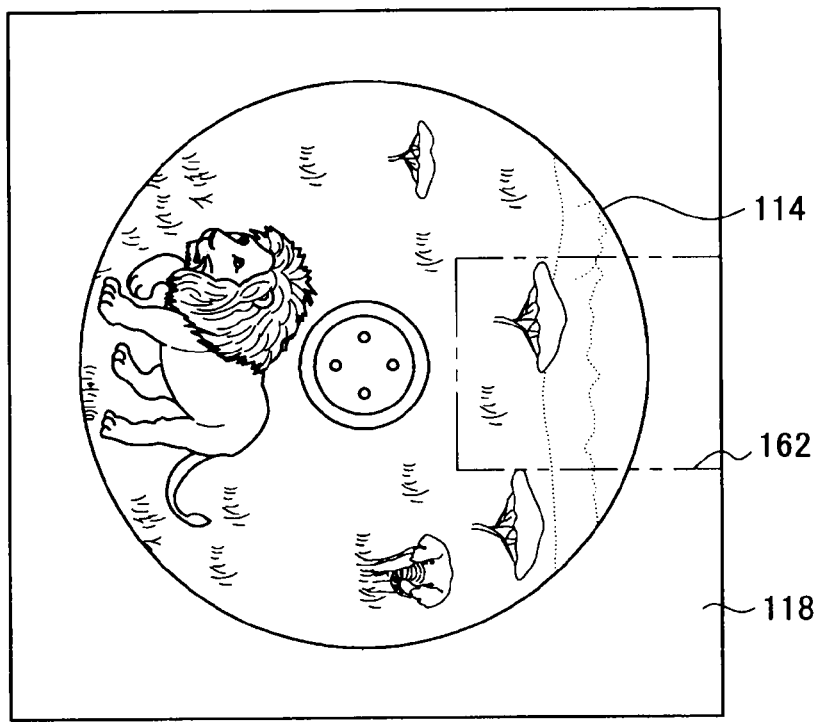
FIG. 9B is an explanatory view showing how the label surface of the optical disk looks like when the strobe light-emitting unit is caused to emit light in the emission timing of a flash 2.
Figure 9C:
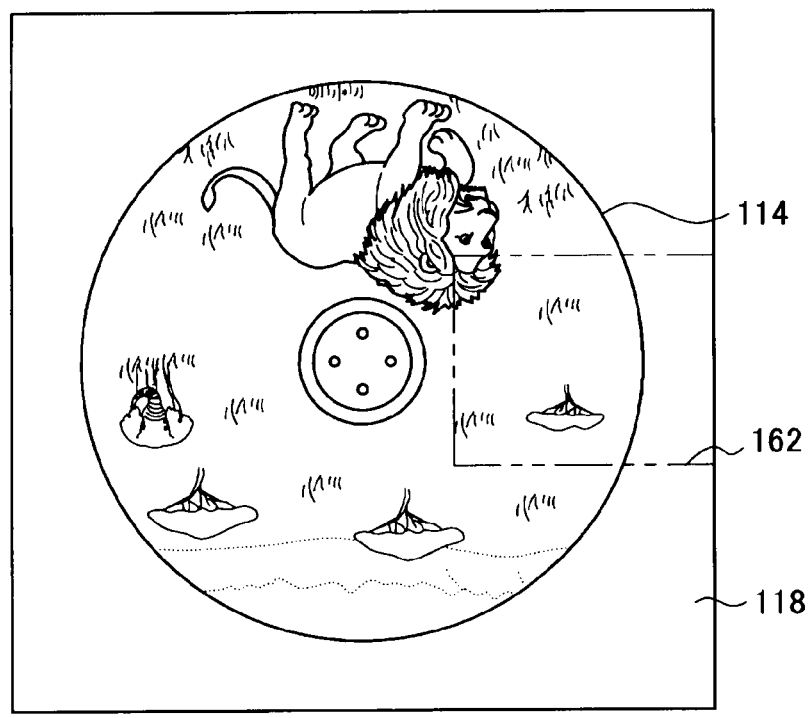
FIG. 9C is an explanatory view showing how the label surface of the optical disk looks like when the strobe light-emitting unit is caused to emit light in the emission timing of a flash 3.
Figure 9D:
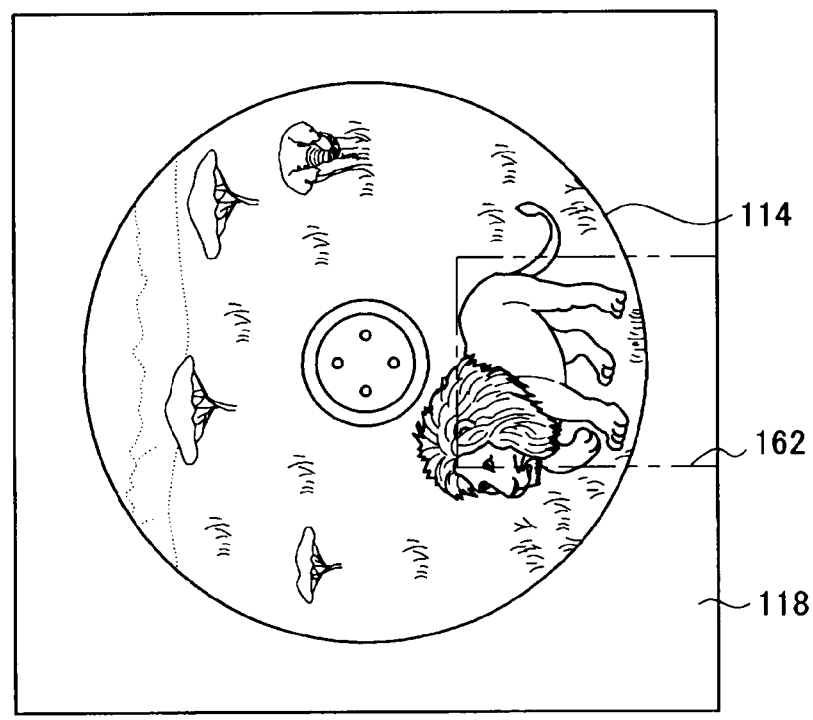
FIG. 9D is an explanatory view showing how the label surface of the optical disk looks like when the strobe light-emitting unit is caused to emit light in the emission timing of a flash 4.

If, for example, in FIG. 6, the emission control unit 128 causes the strobe light-emitting unit 150 to emit light based on emission timing of the flash 1, as shown in FIG. 9A, the optical disk 114 appears to be stopped in the same position as the home position. At this point, the opening 162 corresponds to the area A (see FIG. 7). If the emission control unit 128 causes the strobe light-emitting unit 150 to emit light based on emission timing of the flash 2, as shown in FIG. 9B, the optical disk 114 appears to be stopped in a state rotated by 90° from the home position. At this point, the opening 162 corresponds to the area C (see FIG. 7). Further, if the emission control unit 128 causes the strobe light-emitting unit 150 to emit light based on emission timing of the flash 3, as shown in FIG. 9C, the optical disk 114 appears to be stopped in a state rotated by 180° from the home position. At this point, the opening 162 corresponds to the area E (see FIG. 7). Then, if the emission control unit 128 causes the strobe light-emitting unit 150 to emit light based on emission timing of the flash 4, as shown in FIG. 9D, the optical disk 114 appears to be stopped in a state rotated by 270° from the home position. At this point, the opening 162 corresponds to the area F (see FIG. 7).

Thus, by changing the emission timing of the strobe light-emitting unit 150 based on the reference signal and reference address, the label surface of the optical disk 114 can be viewed at a desired position state. Accordingly, even if a portion of the label surface of the optical disk 114 is viewable from the opening 162 of the optical disk apparatus 100, any position of the label surface can be made viewable from the opening 162. Moreover, when the whole label surface of the optical disk 114 is viewable, the position state of the optical disk 114 can be changed fitting to the direction in which a user views the optical disk 114 by using the emission control method according to the present embodiment.

If visible information written on the label surface of the optical disk 114 and addresses on the board surface are associated, it becomes easier to set the label surface of the optical disk 114 to a desired position state. Here, by using the address used for rotation control of the optical disk 114 when visible information is printed on the label surface as the reference address used for emission control of the strobe light-emitting unit 150, spatial relationships between visible information written on the label surface and addresses on the board surface can be associated. Accordingly, at which position of the disk visible information on the label surface is written can be grasped from the reference address without separate input by the user so that the label surface of the optical disk can be brought into show in a desired position state.

In the foregoing, the configuration of the optical disk apparatus 100 and the emission control method of the strobe light-emitting unit 150 according to the present embodiment have been described. According to the present embodiment, any position on the label surface of the optical disk 114 can visually be recognized based on the reference address on the optical disk 114 and the reference signal (for example, a wobble clock) readable from the board surface of the optical disk 114.

Second Embodiment

Figure 10:
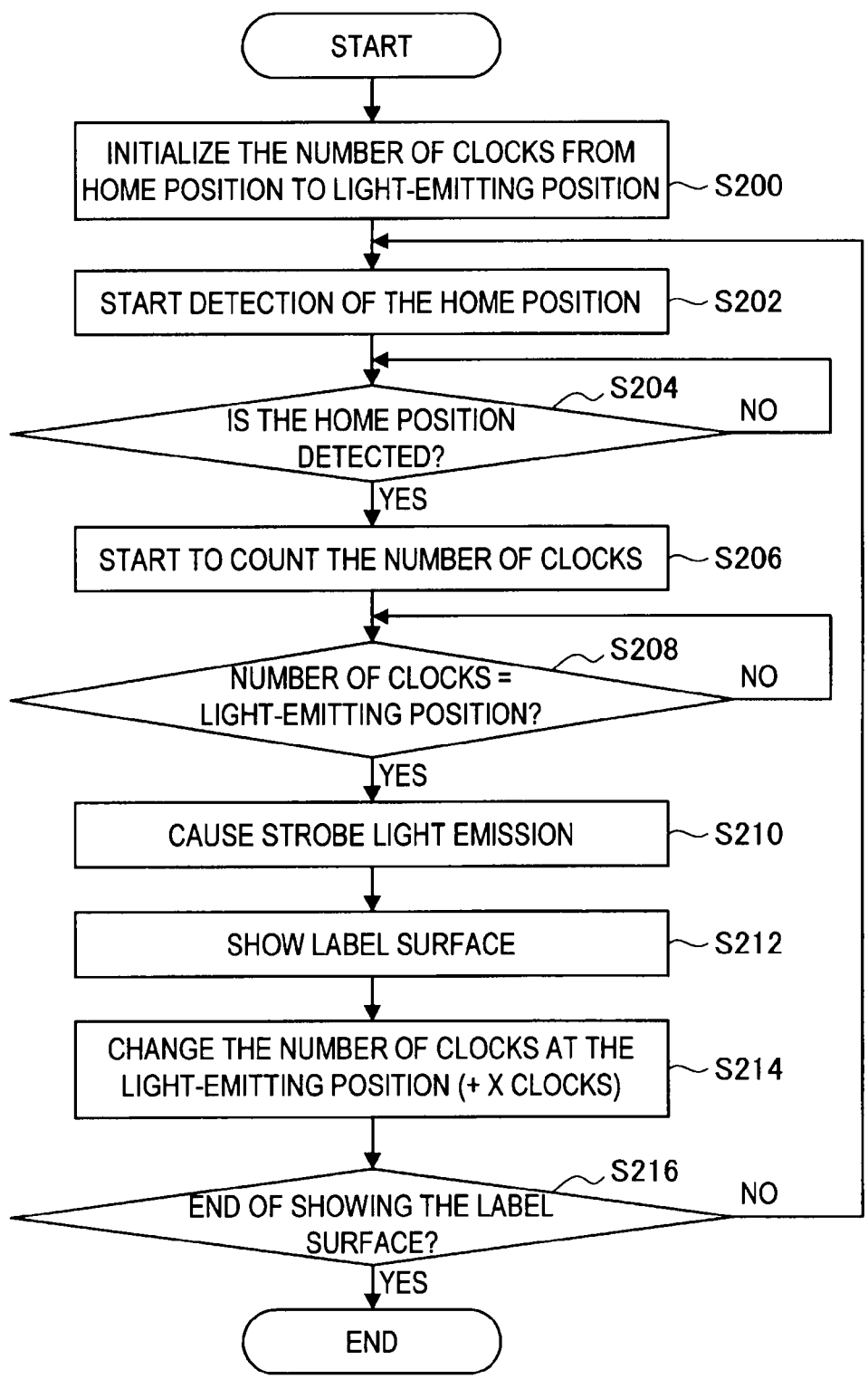
FIG. 10 is a flow chart illustrating the emission control method according to a second embodiment.
Figure 11:
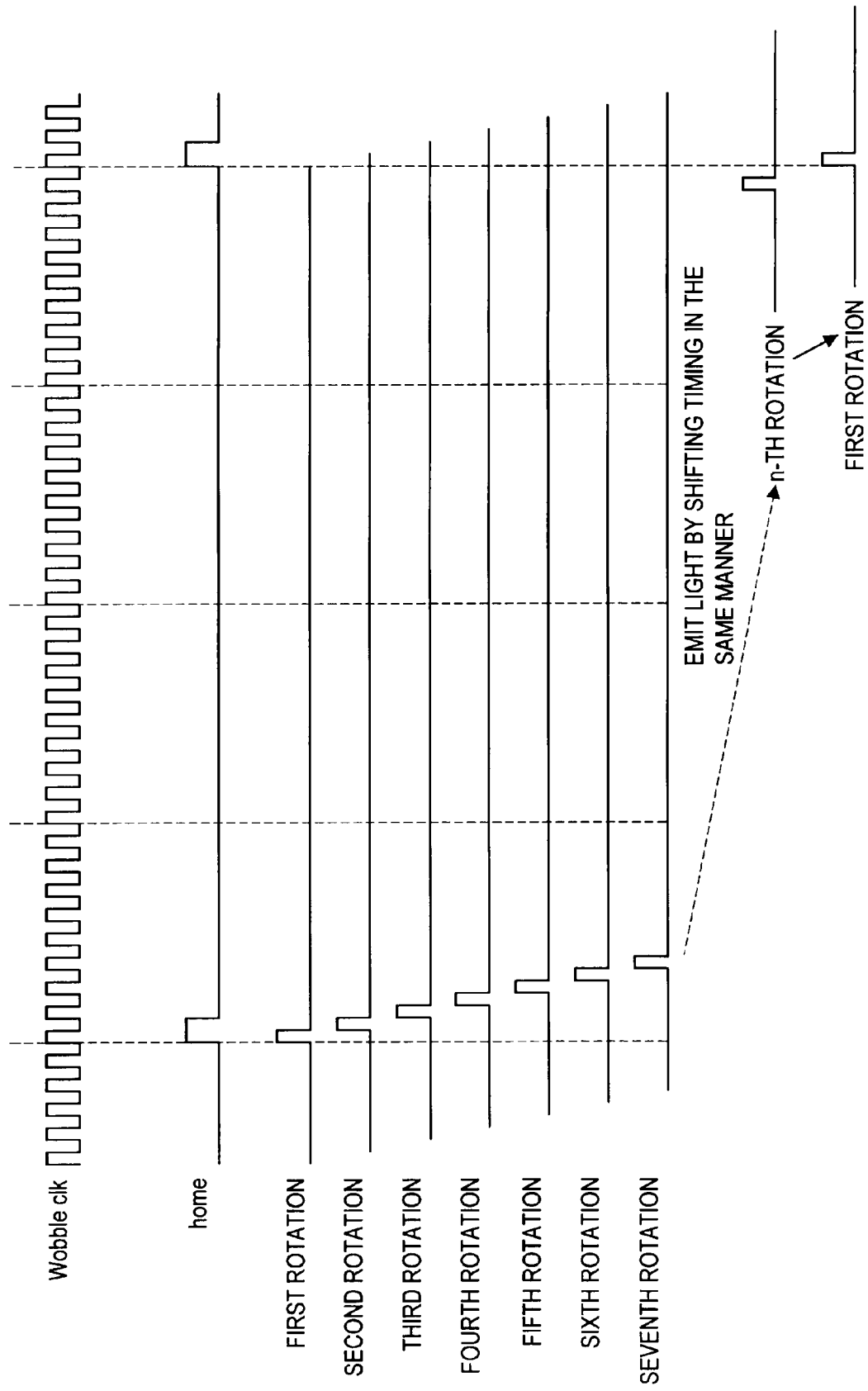
FIG. 11 is an explanatory view illustrating emission timing of the strobe light-emitting unit according to the second embodiment.
Figure 12:
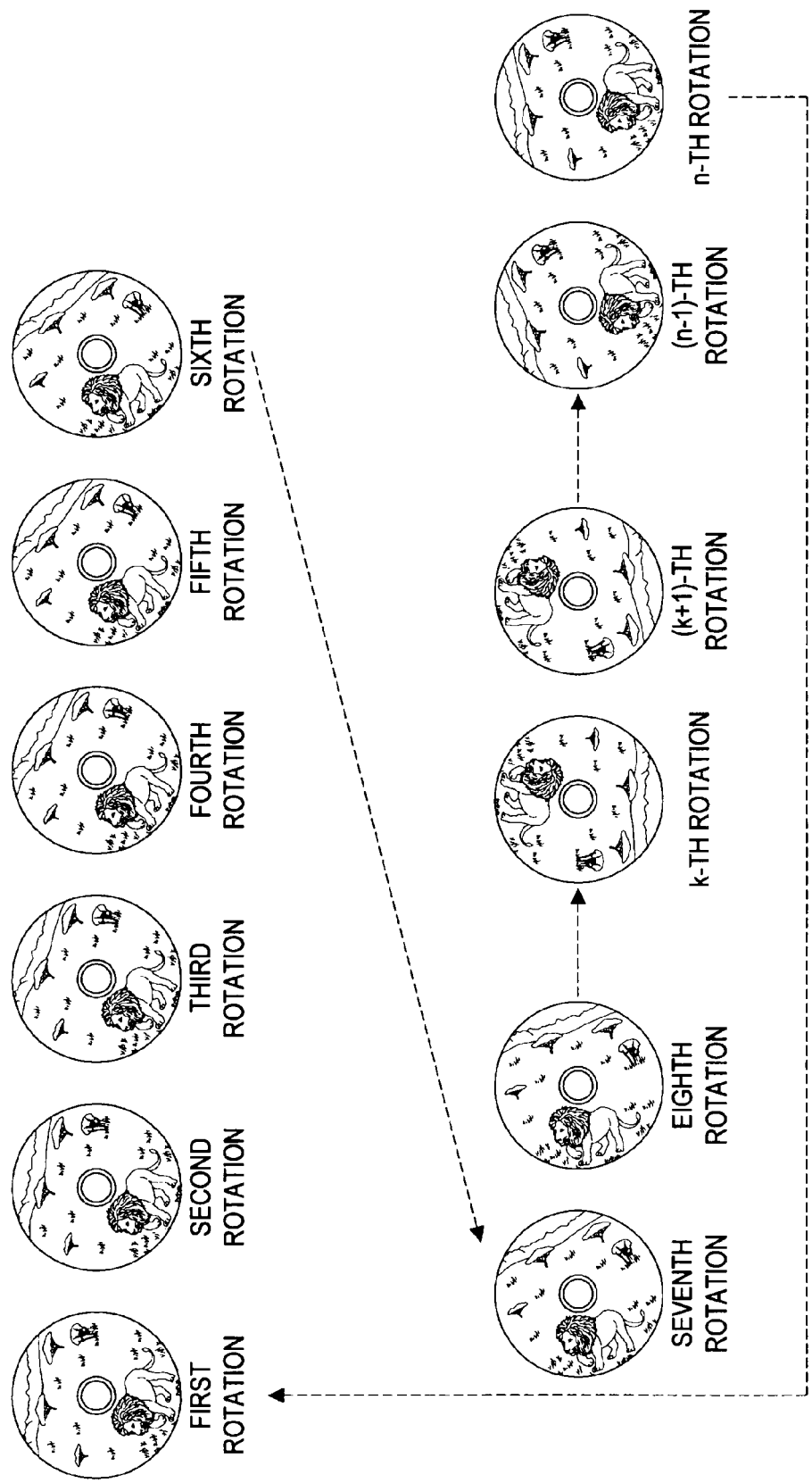
FIG. 12 is an explanatory view showing states of the optical disk viewed in the emission timing shown in FIG. 11.
Figure 13A:
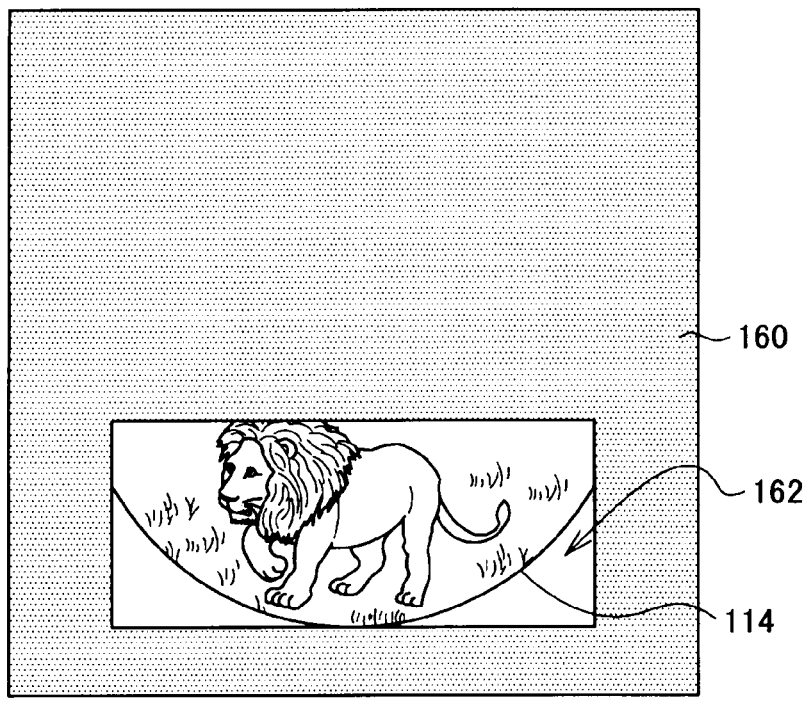
FIG. 13A is an explanatory view showing a state of the optical disk visually recognized from the opening.
Figure 13B:
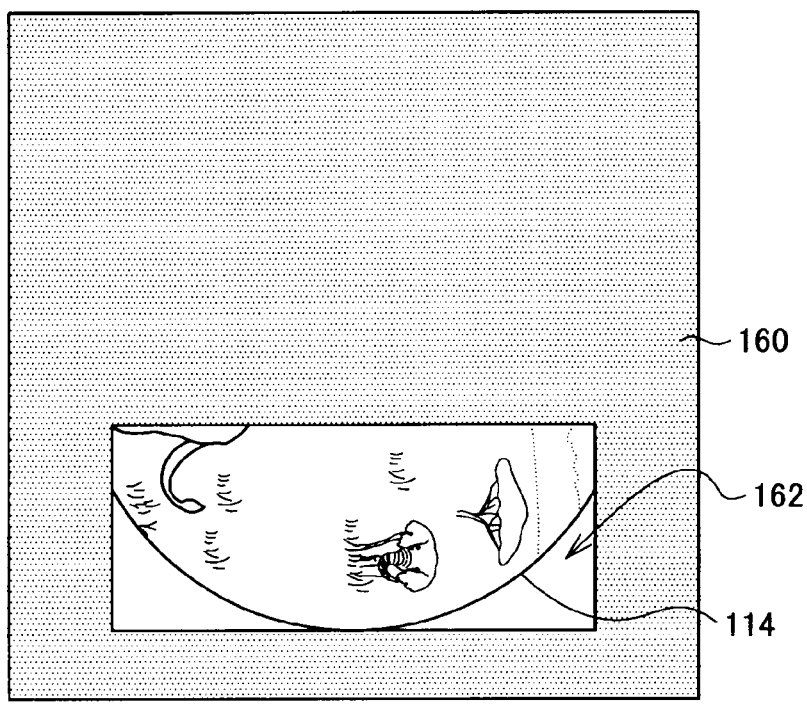
FIG. 13B is an explanatory view showing another state of the optical disk visually recognized from the opening.

Next, the emission control method of the optical disk apparatus 100 according to the second embodiment of the present invention will be described based on FIG. 10 to FIG. 13. The configuration of the optical disk apparatus 100 according to the present embodiment can be made the same as that of the first embodiment. The emission control method according to the present embodiment is characterized in that the strobe light-emitting unit 150 is caused to emit light in such a way that the optical disk 114 can be viewed to be rotating slowly. The emission control method according to the present embodiment will be described below. FIG. 10 is a flow chart illustrating the emission control method according to the present embodiment. FIG. 11 is an explanatory view illustrating emission timing of the strobe light-emitting unit 150 according to the present embodiment. FIG. 12 is an explanatory view showing states of the optical disk 114 viewed in the emission timing shown in FIG. 11. FIG. 13A and FIG. 13B are explanatory views showing states of the optical disk 114 visually recognized from the opening 162. In the description of the emission control method in the present embodiment, a detailed description of the same processing as that in the first embodiment is omitted.

<Emission Control Method>

In the emission control method according to the present embodiment, as shown in FIG. 10, first the clock count from the home position to a light-emitting position is initialized (step S200). Next, detection of the home position is started (step S202). The home position generation unit 124 reads the reference address on the optical disk 114 and sets the position where the reference address and the address read by the optical pickup 116 match as the home position. Then, detection of home position is continued until the home position is detected (step S204).

Further, when the home position is detected, the clock count of the wobble clock from the home position is counted (step S206). It is determined whether the counted clock count and the clock count from the home position to the light-emitting position are equal (step S208) and determination processing is repeated until these clock counts become equal.

If it is determined at step S208 that the counted clock count and the clock count from the home position to the light-emitting position are equal, the emission control unit 128 causes the strobe light-emitting unit 150 to emit light (step S210). Accordingly, the label surface of the rotating optical disk 114 is irradiated with the light so that visible information on the label surface can be viewed (step S212). Incidentally, processing at steps S200 to S212 is the same as that at steps S104 to S116 in the emission control method according to the first embodiment shown in FIG. 5.

Subsequently, the clock count from the home position to the light-emitting position is changed (step S214). In the emission control method according to the present embodiment, as is shown in FIG. 11, the strobe light-emitting unit 150 is caused to emit light in such a way that the optical disk 114 appears to be rotating slowly by shifting emission timing of the strobe light-emitting unit 150 each time the optical disk 114 makes a turn. As described in the first embodiment, if the angle of rotation from the home position to the light-emitting position is expressed by the clock count and the strobe light-emitting unit 150 is caused to emit light when the clock count is counted from the home position, the optical disk 114 can be viewed in a desired position state. Thus, by delaying the emission timing of the strobe light-emitting unit 150 by a predetermined clock count each time the optical disk 114 makes a turn, as shown in FIG. 12, visible information on the label surface appears to be rotating slowing in a predetermined direction.

At step S214, a predetermined clock count is added to the showing clock count, which is the current clock count from the home position to the light-emitting position. By shifting the emission timing of the strobe light-emitting unit 150 in this manner, the optical disk 114 can be made to appear as if to rotate slowly.

Then, it is determined whether any instruction to terminate showing processing of the label surface has been issued (step S216). If no instruction to terminate showing processing has been issued, processing returns to step S202 and the strobe light-emitting unit 150 is caused to emit light based on the newly set showing clock count. If an instruction to terminate showing processing has been issued at step S216, showing processing of the label surface is terminated.

In the foregoing, the emission control method of the strobe light-emitting unit 150 according to the present embodiment has been described. Thus, by making the optical disk 114 appear as if to rotate slowly, the whole label surface can be grasped even if only a portion of the label surface of the optical disk 114 is viewable from the opening 162 of the optical disk apparatus 100. Assume, for example, that visible information viewable from the opening 162 of the optical disk apparatus 100 is as shown in FIG. 13A. Then, when a predetermined time passes, as shown in FIG. 13B, the showing position of the label surface changes so that other visible information than that in FIG. 13A can be viewed.

In the foregoing, the emission control method in the optical disk apparatus 100 according to the present embodiment has been described. According to the emission control method in the present embodiment, the optical disk 114 can be made to appear as if to rotate slowly by delaying the emission timing of the strobe light-emitting unit 150 by a predetermined clock count each time the optical disk 114 makes a turn. Accordingly, the whole label surface can be grasped even if only a portion of the label surface is viewable because the optical disk 114 appears to rotate.

In the foregoing, preferred embodiments of the present invention have been described with reference to drawings, but the present invention is not limited to such examples. It should be understood by those skilled in the art that various modifications or alterations may occur under the category of technical ideas within the scope of appended claims and these modifications or alterations naturally fall within the technical scope of the present invention.

Figure 14:
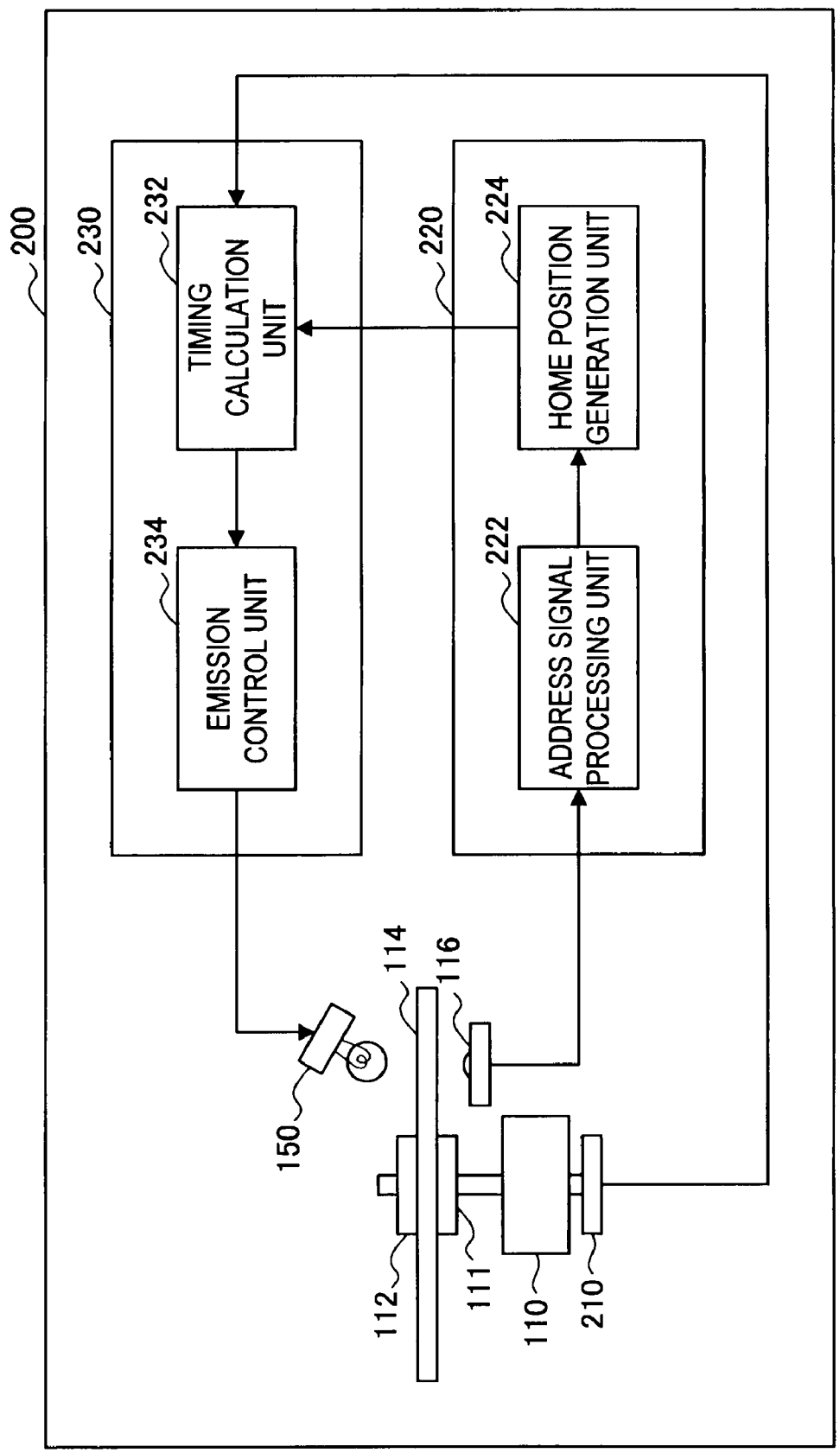
FIG. 14 is a block diagram showing a modification of the configuration of the optical disk apparatus.

In the above embodiments, for example, the control unit 121 is provided in the signal processing unit 120, but the present invention is not limited to such an example. For example, as shown in FIG. 14, a processing unit 220 including an address signal processing unit 222 and a home position generation unit 224 may be provided in the signal processing unit 120 with a processing unit 230 including a timing calculation unit 232 and a emission control unit 234 being provided separately.

Further, in the above embodiments, emission control is exercised by detecting a rotating position of the optical disk 114 using an address readable from the board surface of the optical disk 114, but the present invention is not limited to such an example. For example, by associating an address of the optical disk 114 with an encoder when the optical disk 114 is inserted into the optical disk apparatus 100, emission control can be exercised like the present invention based on pulses of the encoder and a signal of a Z layer.

Further, in the above embodiments, the strobe light-emitting unit 150 is caused to emit light in predetermined timing each time the optical disk 114 makes a turn, but the present invention is not limited to such an example. For example, when the rotating speed of the optical disk 114 is fast, the strobe light-emitting unit 150 may be caused to emit light once each time the optical disk 114 makes a plurality of turns (for example, each time the optical disk 114 makes two turns).

Moreover, the showing clock count may be changed each time the optical disk 114 makes as many turns as a predetermined number. Accordingly, the optical disk 114 can be made to appear as if to rotate slowly.

Thus, if emission control according to an embodiment of the present invention is exercised in a system in which label printing is performed using a home signal and a clock on the board surface of the disk, a user can view any printed location. If the clock count at which light is emitted is changed for each turn, a print appearance can be made to appear as if to rotate slowly. At this point, a method of exercising emission control by associating an address on disk with an encoder can operate in the same manner as a method of exercising emission control by using a clock of the board surface of the disk.

The present application contains subject matter related to that disclosed in Japanese Priority Patent Application JP 2008-181715 filed in the Japan Patent Office on Jul. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk apparatus, comprising:
a rotation driving unit that rotates a recording medium on whose information recording surface a plurality of addresses is recorded;
an optical pickup that records an information signal onto and plays back the information signal from the information recording surface of the recording medium that is rotated by the rotation driving unit;
a light-emitting unit that irradiates a label surface of the recording medium with light;
a control unit that causes the light-emitting unit to emit light based on an address selected from the plurality of addresses as a reference address and a reference signal readable from the recording medium, wherein
the control unit includes
a detection unit that detects the reference signal by the optical pickup;
a deciding unit that decides a reference position state of the recording medium based on the reference address;
a timing calculation unit that calculates emission timing when the light-emitting unit is caused to emit light based on the reference signal and the reference address; and
an emission control unit that causes the light-emitting unit to emit light based on the emission timing,
the timing calculation unit calculates a showing clock count obtained by converting an angle of rotation of the recording medium from the reference position state to a light-emitting position where the light-emitting unit is caused to emit light into the clock count of the reference signal, and
the emission control unit starts to count the clock count of the reference signal from the reference position state and causes the light-emitting unit to emit light when the clock count reaches the showing clock count; and
an input unit that inputs a showing position of the label surface of the recording medium, wherein
the timing calculation unit converts the angle of rotation of the recording medium from the reference position state until the showing position is brought into show into the showing clock count, and the emission control unit counts the clock count of the reference signal from the reference position state and causes the light-emitting unit to emit light when the clock count reaches the showing clock count.

2. The optical disk apparatus according to claim 1, wherein the emission control unit counts the clock count of the reference signal from the reference position state each time the recording medium makes as many turns as a predetermined number and causes the light-emitting unit to emit light when the clock count reaches the showing clock count.

3. The optical disk apparatus according to claim 2, wherein the predetermined number is 1 or a number equal to or greater than 2.

4. The optical disk apparatus according to claim 1, wherein the timing calculation unit changes the showing clock count by a predetermined clock count each time the recording medium makes as many turns as a predetermined number.

5. The optical disk apparatus according to claim 1, wherein the reference address is an address serving as a reference of rotation control of the recording medium when the label surface of the recording medium is printed.

6. An emission control method comprising:

rotating a recording medium on whose information recording surface a plurality of addresses is recorded;

recording an information signal onto and playing back the information signal from the information recording surface of the rotated recording medium;

irradiating a label surface of the recording medium with light;

causing a light-emitting unit to emit light based on an address selected from the plurality of addresses as a reference address and a reference signal readable from the recording medium;

detecting the reference signal;

deciding a reference position state of the recording medium based on the reference address;

calculating emission timing when the label surface is irradiated with light based on the reference signal and the reference address;

irradiating the label surface with light based on the emission timing;

calculating a showing clock count obtained by converting an angle of rotation of the recording medium from the reference position state to a light-emitting position where the label surface is irradiated with light into the clock count of the reference signal;

starting to count the clock count of the reference signal from the reference position state;

irradiating the label surface with light when the clock count reaches the showing clock count;

receiving an input a showing position of the label surface of the recording medium;

converting the angle of rotation of the recording medium from the reference position state until the showing position is brought into show into the showing clock count; and counting the clock count of the reference signal from the reference position state and irradiating the label surface with light when the clock count reaches the showing clock count.

* * * * *